May 23, 1972    KIMIO KANDA    3,664,743
SPECTROPHOTOMETER
Filed Nov. 3, 1969    2 Sheets-Sheet 2
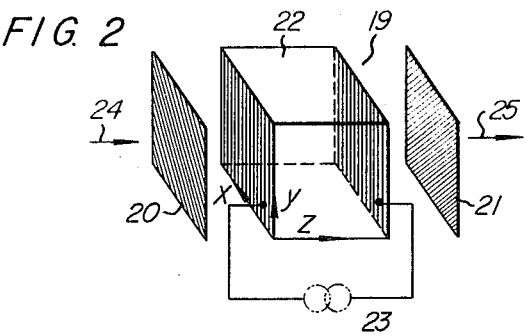
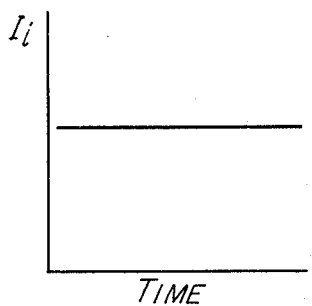
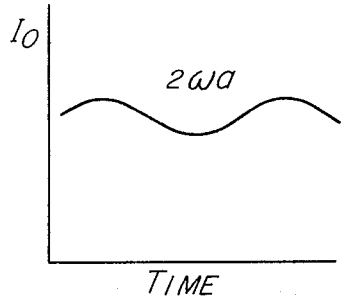
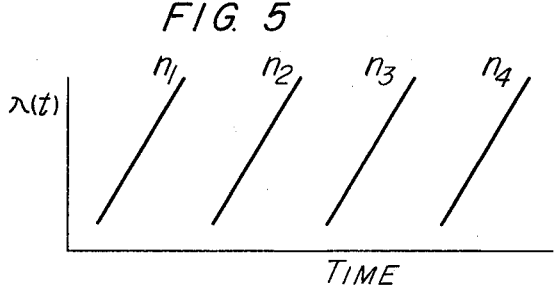
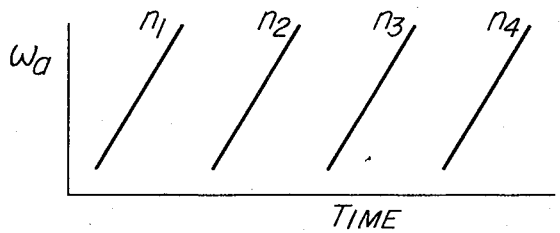
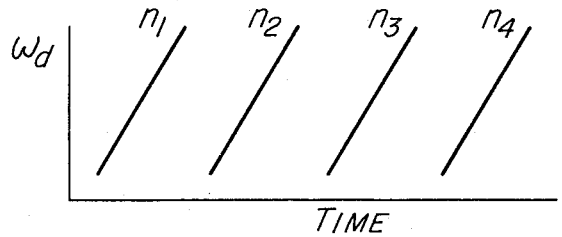
INVENTOR
KIMIO KANDA
BY Craig, Antonelli, Stewart & Hill
ATTORNEY United States Patent Office 3,664,743
Patented May 23, 1972

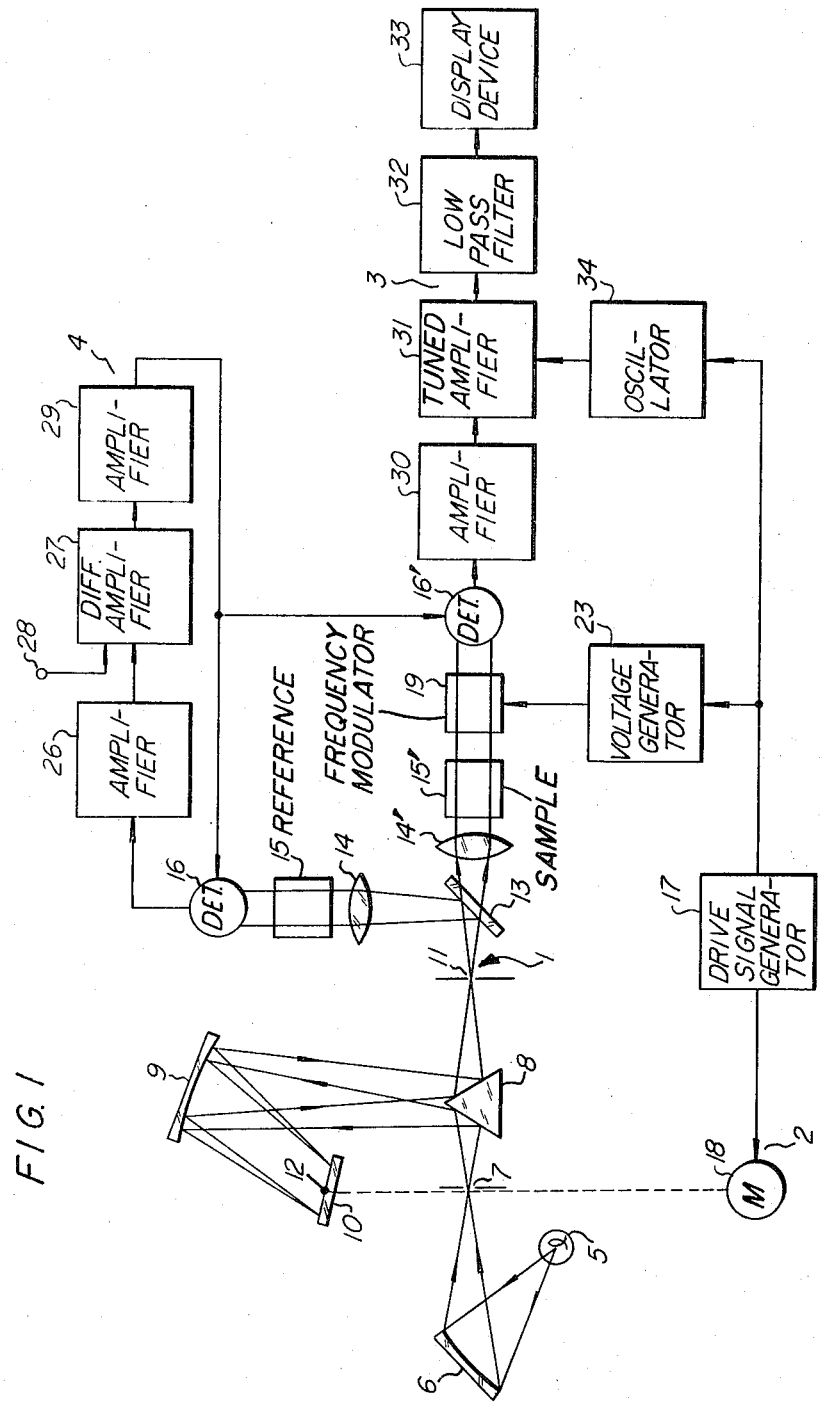

3,664,743
SPECTROPHOTOMETER
Kimio Kanda, Mito-shi, Japan, assignor to
Hitachi, Ltd., Tokyo, Japan
Filed Nov. 3, 1969, Ser. No. 873,328
Claims priority, application Japan, Nov. 4, 1968,
43/79,964
Int. Cl. G01j 3/42
U.S. Cl. 356—83                                   8 Claims

ABSTRACT OF THE DISCLOSURE

A spectrophotometer in which a light to be directed to a detector is scanned and at the same time it is modulated in frequency corresponding to the wavelength of the light to be scanned, thus an angular frequency of an electric signal taken out from said detector corresponding to the modulation is made to be selected.

BACKGROUND OF THE INVENTION

Field of the invention

This invention relates to a spectrophotometer and more particularly to a spectrophotometer for measuring a physical quantity of a sample to be measured.

Description of the prior art

In a spectrophotometer, a test run is generally performed to carry out the scanning of wavelengths and to get a time variation curve of absorption of light of the sample to be measured extending over the whole wavelength range of the scanning at every wavelength of scanning. However, the accuracy of measurement is not entirely exact.

SUMMARY OF THE INVENTION

One object of the present invention is to provide a spectrophotometer which is able to measure such a physical quantity as the absorption of light of a sample to be measured.

Another object of the present invention is to provide a spectrophotometer by which a time variation of such physical quantity as absorption of light of a sample to be measured extending over the whole wavelength range of the scanning can be correctly obtained.

A further object of the present invention is to provide a spectrophotometer in which the scanning of wavelengths is repeatedly carried out over a range of wavelengths, thus the time variations of such a physical quantity as the absorption of light by a sample to be measured extending over the said wavelength range can be correctly obtained at each time of the scanning.

Still another object of the present invention is to provide a spectrophotometer by which a physical quantity of a sample to be measured at a particular one or a plurality of wavelength positions in a wavelength range can be determined correctly while the scanning wavelengths are repeatedly carried out in the wavelength range.

One feature of the present invention is a spectrophotometer for measuring a physical quantity of a sample to be measured provided by means for carrying out the scanning of wavelengths and a means for converting the light resulting from the scanning of wavelengths into an electric signal, which spectrophotometer is further provided by a means for modulating the light to be detected by said converting means by an angular frequency corresponding to said scanning wavelength so that said electric signal has an angular frequency component corresponding to said scanning wavelength, a means for selecting at least one desired angular frequency component in said electric signal having an angular frequency component corresponding to said scanning wavelength and a means for taking out the electric signal having the selected desired angular frequency component.

Other objects and features of the present invention will become apparent from the following description taken in conjunction with the accompanying drawings.

BRIEF DESCRIPTION OF THE DRAWINGS

FIG. 1 is a block diagram of a spectrophotometer illustrating an embodiment according to the present invention.

FIG. 2 is a perspective view illustrating an embodiment of a light modulation means in FIG. 1.

FIG. 3 is a diagram illustrating the relation between the electric field strength of the light incident into the light modulation means shown in FIG. 1 and time.

FIG. 4 is a diagram illustrating the relation between the electric field strength of the light coming out from the light modulation means shown in FIG. 1 and time.

FIG. 5 is a diagram illustrating the mode of the scanning of wavelengths in the embodiment shown in FIG. 1.

FIG. 6 is a digram illustrating the relation between the modulation angular frequency of the light modulation means shown in FIG. 1 and time.

FIG. 7 is a digram illustrating the relation between the angular frequency of the input electric signal to the tuned amplifier shown in FIG. 1 and time.

DESCRIPTION OF THE PREFERRED EMBODIMENTS

Referring to FIG. 1, there is shown a spectrophotometer according to the present invention, which has an optical system 1, a dispersion means driving system 2, a detection system 3 and a compensation system 4.

The optical system 1 has a light source lamp 5, a light source mirror 6, an incident slit 7, a triangular plane mirror 8, a collimating mirror 9, a diffraction grating 10 as a dispersion means and an exit slit 11. A white light or multi-wavelength light radiated from the light source 1 is focussed on the incident slit 7 by the light source mirror 6, then the light emitted therefrom is directed onto the collimating mirror 9 by the triangular plane mirror 8. The white light reflected by the collimating mirror 9 is directed to the diffraction grating 10 in a parallel beam of light, and thence it is dispersed depending upon wavelengths. The dispersed light is reflected back again to the collimating mirror 9 in a parallel beam of light, and it is then focussed onto the exit slit 11 via the triangular plane mirror 8. The diffraction grating 10 is so designed as to be rotatable around its center 12, but this is not shown in the figure. When the diffraction grating 10 is rotated around its center 12 by the dispersion means driving system 2 which will be described later, the so-called scanning of wavelengths is carried out, then various monochromatic light is taken out successively from the exit slit 11. The optical system 1 also has a semi-transparent mirror, that is, a half-mirror 13, collimating lenses 14 and 14', reference side and measuring side sample cells 15 and 15', and reference side and measuring side detectors 16 and 16'. The light coming out from the exit slit 11 is directed to the half mirror 13, and there it is divided into two beams of light. One of the divided beams of light is collimated by the collimating lens 14 and after transmitting the reference side sample cell 15 it is detected by the reference side detector 16. Similarly, another side of the divided beam of light is collimated by the collimating lens 14' and after transmitting the measuring side sample cell 15' it is detected by the measuring side detector 16'. Of course, a reference sample and measuring sample are introduced into the reference side sample cell 15 and measuring side sample cell 15', respectively.

The dispersion means driving system 2 has a dispersion means driving device 18 constructed by a dispersion means driving signal generator 17 for generating such a dispersion means driving signal as a sinusoidal waveform, sawtooth waveform or triangular waveform and a movable coil (not shown) rotated by means of the driving signal, and the dispersion means driving device is so designed that the dispersion means 10 is rotated around its center 12 by said movable coil. The dispersion means driving system 2 is well known in general, therefore illustration of its details are omitted.

When a dispersion means driving signal—for example a sawtooth waveform—is generated by the dispersion means driving signal generator 17 and is applied to the movable coil of the dispersion means driving device 18, the movable coil is repeatedly oscillated rotationally within a certain angle. Then, the diffraction grating 10 is also repeatedly oscillated rotationally within a certain angle around its center 12. This is the so-called repeated scanning of wavelength, and the wavelength $\lambda(t)$ of the light coming out from the exit slit 11 can be displayed as a function of time $t$ as shown in FIG. 5 by this repeated scanning of the wavelength. In the figure, the reference marks $n_2$, $n_2$, . . . indicate the times of wavelength scanning, and these marks are also used to indicate the same meaning in FIGS. 6 and 7 described later. The time of one wavelength scanning can be 1 second or less than a few seconds and can be, for example, 0.15 second.

The optical system 1 has further a light modulation device 19, which is located between the measuring side sample cell 15' and the measuring side detector 16'. The detail of the light modulation device is shown in FIG. 2, and has incident and exit polarization plates 20 and 21 of which the oscillation plane (a plane perpendicular to the polarization plane) is orthogonal with each other and a light modulation element 22 placed between the polarization plates. A material having a first order electro-optical effect can be used for the light modulation element, or a material having a second order electro-optical effect can also be used for the element. Such materials as KDP ($KH_2PO_4$), ADP ($NH_4H_2PO_4$), $LiTaO_3$, $KD_2PO_4$, quartz, CuCl, ZnS, CaAs, ZnTe and $BaTiO_3$ are known as materials having a first order electro-optical effect. Also, such materials as KTN ($KTa_{0.65}Nb_{0.35}O_3$), $BaNaNb_5O_{15}$, $K_{0.6}Li_{0.4}NbO_3$, $SrTiO_3$ and $BaTiO_3$ are known as materials having a second order electro-optical effect. The light modulation element 22 shown in FIG. 2 is exemplified as being made by a material having a first order electro-optical effect, therefore, a voltage of which the angular frequency can be varied is made to be applied to the z-axis direction of the light modulation element 22 (see FIG. 2) from a voltage generator 23. The transmitted light through the measuring side sample cell 15' in FIG. 1 enters into the incident polarization plate 20 from the direction indicated by an arrow 24 in FIG. 2. If there is no light modulation element 22, the exit light (polarized light) from the incident polarization plate 20 will be interrupted by the exit polarization plate 21 since the oscillation plane of each polarization plate is orthogonal with each other. However, when the light modulation element 22 is placed between the polarization plates the oscillation plane of the incident polarization plate 20 is rotated by the element 22 and a light which oscillates in the direction parallel to the oscillation plane of the exit polarization plate 21 is taken out from it in the direction indicated by an arrow 25. That is, the oscillation plane of the incident polarization plate 20 is rotated by means of a voltage applied to the light modulation element 22 and the magnitude of the electric vector of the light taken out in the direction of the arrow 25 from the exit polarization plate 21 is changed by changing the angular frequency of the said applied voltage with angular frequency twice that of the said angular frequency.

FIGS. 3 and 4 indicate how the light incident into the light modulation device 19 is modulated by the change. It is assumed that the light incident into the incident polarization plate 20 is polarized to oscillate in a plane angled by 45° to the x- and y-axes (see FIG. 2) by the polarization plate and the polarized light advances along the z-axis. Since a difference in propagation velocity is produced between the x-polarization component and y-polarization component when the polarized light is transmitted through the light modulation element 22, a phase difference is produced between the two polarization components at the exit of the light modulation element 22, and the electric vector of the light transmitted through the exit polarization plate 21 comes to have the angular frequency $2\omega_a$ by applying a voltage having the angular frequency $\omega_a$ in the z-axis direction of the light modulation element 22. This can be expressed by a formula as follows. That is, when the strength of the electric field of the light incident into the incident polarization plate 20 is expressed as $$(iE_X + jE_Y) \cos (\omega t + \phi_1)$$

where $i$ and $j$ indicating the x- and y-direction unit vectors, the strentgh of the electric field of the light transmitted through the exit polarization plate 21 is expressed as follows, $$\frac{1}{\sqrt{2}}(iE_X + jE_Y) \sin \theta$$

$$+ \frac{1}{\sqrt{2}}(iE_X + jE_Y)\alpha \cos 2\omega_a t \cos (\omega t + \phi_0)$$

where $\theta$ is the center value of rotation angle of the light oscillation plane, $\alpha$ a coefficient of modulation and $\omega_a$ the modulation angular frequency. FIG. 3 is a graph illustrating the electric field strength $I_1$ of the light incident into the incident polarization plate 20 and FIG. 4 is a graph illustrating the electric field strength $I_0$ of the light having the angular frequency $2\omega_a$ after being transmitted through the exit polarization plate 21, the abscissa indicating time $t$ in both figures.

The light having the electric field strength as shown in FIG. 4 is detected by the measuring side detector 16' and is converted into a current or voltage electric signal. This electric signal is proportional to the square of the electric field amplitude of said light since it is proportional to the energy of the light incident into the detector 16', then the angular frequency component of the electric signal becomes a DC component, $2\omega_a$ and $4\omega_a$.

The compensation system 4 has a pre-amplifier 26 connected to the output side of the reference side detector 16, a differential amplifier 27 having two input terminals, a standard power source terminal 28 and a main amplifier 29 connected to the output side of the differential amplifier 27, wherein one input terminal and another input terminal of the differential amplifier 27 are connected to the output side of the pre-amplifier 26 and the standard power source terminal 28, respectively, and the output side of the main amplifier 29 is connected to bias power sources (not shown) of the reference side detector 16 and the measuring side detector 16', respectively.

The output signal of the reference side detector 16, that is, reference electric signal is fed to the differential amplifier 27 through the pre-amplifier 26, where it is compared with a standard electric signal from the standard power source terminal 28, and a difference between the two signals is led to the bias power sources (not shown) of the reference side detector 16 and the measuring side detector 16' through the main amplifier 29, respectively. The bias of the detectors 16 and 16' is so controlled that the difference itself between said reference signal and standard signal becomes zero, thus the sensitivity characteristic of the reference side detector 16 and the measuring side detector 16' is kept constant regardless of, for example, variations in the light source, therefore, the output signal of the measuring side detector 16' represents the true absorption of light by a sample to be measured as the electric signal which is compared with the reference electric signal.

The detection system 3 has a pre-amplifier 30, a tuned amplifier, that is, a lock-in amplifier 31, a low-pass filter 32 and a display device 33 such as recorder or oscilloscope and these are connected successively. The tuned amplifier produces an output electric signal having a coincident angular frequency when an angular frequency of an electric signal fed to it coincides with a tuning frequency and the tuning frequency is determined by a frequency generated by a variable frequency oscillator 34.

The variable frequency voltage generator 23 is connected to the dispersion means driving signal generator 17 so that the wavelength scanning is made to be carried out synchronously by making it correspond one by one to the angular frequency of the voltage generated by the voltage generator 23 with the scanning wavelength. Therefore, when the wavelength scanning is carried out repeatedly as shown in FIG. 5, the angular frequency $\omega_a$ of the voltage generated by the voltage generator 23 is repeatedly scanned or swept to time $t$ in synchronization with said wavelength scanning as shown in FIG. 6.

The signal representing the absorption of a sample to be measured from the measuring side detector 16' is amplified by the pre-amplifier 30 and is then applied to the tuned amplifier 31. The relation between an angular frequency $\omega_d$ of the electric signal applied to the tuned amplifier 31 and time $t$ is shown in FIG. 7. Of course, as can be seen from above, $\omega_d$ includes the angular frequency components $2\omega_a$ and $4\omega_a$. As described above, $\omega_a$ corresponds one by one with the scanning wavelength $\lambda(t)$, then $2\omega_a$ and $4\omega_a$ also correspond one by one with the scanning wavelength $\lambda(t)$. Therefore, when the tuning frequency of the tuned amplifier 31 is set to $2\omega_a$ or $4\omega_a$, only the electric signal having an angular frequency $2\omega_a$ or $4\omega_a$ comes out from the tuned amplifier 31 amplified by it in the electric signal having the angular frequency $\omega_d$ led to the tuned amplifier 31. This electric signal is led to the display device 33 through the low-pass filter 32. Therefore, the time variation curve of absorption of a sample to be measured as displayed or recorded on this display device over the whole wavelength scanning range at each time of the wavelength scanning. The tuning frequency of the tuned amplifier 31 is, as described above, determined by the frequency generated by the variable frequency oscillator 34. However, the tuned amplification of the electric signal having the angular frequency $2\omega_a$ or $4\omega_a$ must also be synchronized with each wavelength scanning at each time of the wavelength scanning. For this purpose the variable frequency oscillator 34 is connected to the dispersion means driving signal generator 17. The wavelength scanning at each time can be carried out for a relatively long period, but also it can be carried out in such a short time as one second or a few seconds, or 0.15 second for example.

Though, such wavelength scanning as to obtain the time variation curve of absorption of a sample to be measured for the whole scanning wavelength range at each time of the wavelength scanning has been carried out in the conventional spectrophotometer, according to the study of the inventors, it is found that a more accurate measuring result can be obtained by the spectrophotometer of the present invention compared with the conventional spectrophotometer.

It is often required to obtain the time variation of absorption of a sample to be measured at one or a plurality of wavelength positions after said time variation curve of absorption of the sample to be measured for the whole scanning wavelength range is obtained at each time of the wavelength scanning. In such case, the time variation of the absorption of the sample to be measured at one or a plurality of wavelength positions corresponding to one or a plurality of tuning frequencies can be displayed on the display device 33 only by the operation of setting up the frequency generated by the variable frequency oscillator 34, that is, the tuning frequency an arbitrary one or a plurality of frequencies. In this case, it is found according to the result of the study of the inventors that the displaying value can be read to such a good wavelength accuracy as about 1–2 A.

The monochromatic light coming out from the exit slit 11 is partially polarized. Therefore, it is desirable to interpose a depolarizer (not shown) at an arbitrary place behind the exit slit 11, for example, between the slit 11 and half mirror 13.

Since well known circuits can be used as the individual circuit in FIG. 1, an illustration and description about their details are omitted.

Various changes and modifications may be made in the above spectrophotometer without departing from the spirit of the present invention, and it should be understood that the above description is only given to assist an understanding of the present invention and not to limit the present invention.

I claim:

1. A spectrophotometer for measuring a physical quantity of a sample to be measured comprising first means for generating light, dispersing means for dispersing the light from said first means into its constituent wavelengths, second means for scanning the wavelengths of said light derived from said dispersing means with respect to an exit slit, third means for converting the light resulting from the wavelength scanning into an electric signal, fourth means for frequency modulating the light applied to said third means by an angular frequency related to said scanning wavelengths scanned by said second means so that said electric signal has an angular frequency component related to the wavelength at said exit slit, fifth means coupled to said third and fourth means for selecting at least one desired angular frequency component in said electric signal having an angular frequency related to said wavelength at said exit slit and sixth means coupled to said fifth means for deriving the electric signal having the selected desired angular frequency component.

2. A spectrophotometer for measuring a physical quantity of a sample to be measured comprising first means for generating light, dispersing means for dispersing the light from said first means into its constituent wavelengths, second means for repeatedly scanning the wavelengths of said light derived from said dispersing means with respect to an exit slit, third means for converting the light resulting from the wavelength scanning into an electric signal, fourth means for frequency modulating the light applied to said third means by an angular frequency component related to said scanning wavelengths for each wavelength obtained at said exit slit, fifth means coupled to said third and fourth means for selecting at least one angular frequency component of said scanned wavelengths in synchronization with the wavelengths obtained at said exit slit during the wavelength scanning and sixth means coupled to said fifth means for deriving the electric signal having the selected desired angular frequency component at each time of said wavelength scanning.

3. A spectrophotometer for measuring a physical quantity of a sample to be measured comprising first means for generating light, dispersing means for dispersing the light from said first means into its constituent wavelengths, second means for repeatedly scanning the wavelengths of said light derived from said dispersing means with respect to an exit slit, third means for converting the light resulting from the wavelength scanning into an electric signal, light modulating means provided with two polarization plates having oscillation planes orthogonal with each other and a light modulation element having an electro-optical effect interposed between them for frequency modulating the light to be converted by said third means by the angular frequency of an electric signal applied to said light modulation element in synchronization with said wavelength scanning, said angular frequency being varied to relate each wavelength component derived from the exit slit during said scanning, whereby said electric signal includes an angular frequency component relating to said scanning wavelengths for each wavelength obtained at said exit slit; fourth means coupled to said second and third means for amplifying the electric signal having the angular frequency component related to said scanning wavelength in synchronization with said wavelength scanning; and fifth means coupled to said fourth means for deriving the synchronously amplified electric signal.

4. A spectrophotometer according to claim 3, characterized in that said fourth means amplifies an electric signal having one angular frequency component corresponding to said scanning wavelength in said electric signal.

5. A spectrophotometer according to claim 3, characterized in that said fourth means ampifies an electric signal having a plurality of discrete angular frequency components corresponding to said scanning wavelength in said electric signal.

6. A spectrophotometer for measuring the absorption of light of a sample comprising an optical system having a light source for generating light, dispersing means for dispersing the light from said light source into its constituent wavelengths, first means for repeatedly carrying out wavelength scanning of said light derived from said dispersing means with respect to an exit slit so as to obtain successively monochromatic light of different wavelengths which is transmitted through said sample during the wavelength scanning by said first means; photo-electric converting means for converting the transmitted light into an electric signal; second means for frequency modulating the monochromatic light successively directed to said photo-electric converting means including polarization plates having oscillation planes orthogonal with each other and a light modulation element having an electro-optical effect interposed between them so as to modulate the monochromatic light directed to said photo-electric converting means by the angular frequency of an electric signal applied to said light modulation element in synchronization with said wavelength scanning, said angular frequency being varied to relate to each wavelength component derived from the exit slit on a one by one basis during said scanning, whereby said electric signal comes to include an angular frequency component relating to said scanning wavelengths for each wavelength obtained at said exit slit; third means coupled to said converting means and said first means for amplifying the electric signal having the angular frequency component related to said scanning wavelength in synchronization with said wavelength scanning; and fourth means coupled to said third means for displaying the synchronously amplified electric signal.

7. A spectrophotometer according to claim 6, characterized in that said third means amplifies either of one angular frequency component or a plurality of discrete angular frequency components corresponding to said scanning wavelength in said electric signal.

8. A spectrophotometer according to claim 7, wherein said optical system comprises means to divide the monochromatic light provided by said wavelength scanning into two light paths, said sample to be measured being arranged in one of the light paths and the monochromatic light transmitted through the sample to be measured being detected by said converting means, a reference sample being arranged in the other light path and the monochromatic light transmitted through the reference sample being detected by additional converting means, which spectrophotometer is further provided with means for controlling the bias of said firstly described converting means in response to an electric signal from said additional converting means so that an electric signal from said firstly described converting means is compared with the electric signal from said additional converting means thereby keeping the sensitivity characteristic of said converting means constant.

References Cited

UNITED STATES PATENTS

| | | | |
|---|---|---|---|
| 3,506,358 | 4/1970 | Baba et al. | 356—88 |
| 3,510,224 | 5/1970 | Hooper | 356—97 |
| 3,521,958 | 7/1970 | Treharne | 356—93 X |

RONALD L. WIBERT, Primary Examiner

F. L. EVANS, Assistant Examiner

U.S. Cl. X.R.

356—93, 97